(12) United States Patent
Zutz

(10) Patent No.: US 6,921,078 B2
(45) Date of Patent: Jul. 26, 2005

(54) SLIP RING SEAL

(75) Inventor: Hans-Henning Zutz, Wermelskirchen (DE)

(73) Assignee: Federal-Mogul Friedberg, GmbH, Friedberg (DE)

( * ) Notice: Subject to any disclaimer, the term of this patent is extended or adjusted under 35 U.S.C. 154(b) by 0 days.

(21) Appl. No.: 10/642,994

(22) Filed: Aug. 18, 2003

(65) Prior Publication Data
US 2004/0113371 A1 Jun. 17, 2004

(30) Foreign Application Priority Data
Aug. 21, 2002 (DE) .......................... 102 38 166

(51) Int. Cl.⁷ ................................. F16J 15/34
(52) U.S. Cl. ................ 277/358; 277/370; 277/394; 277/397
(58) Field of Search ................ 277/358, 370, 277/372, 390, 394, 397

(56) References Cited

U.S. PATENT DOCUMENTS 3,241,844 A * 3/1966 Morley ................. 277/370
3,940,154 A * 2/1976 Olsson ................. 277/381
4,256,315 A 3/1981 Larson et al.
6,494,459 B1 * 12/2002 Zutz ................... 277/390

FOREIGN PATENT DOCUMENTS

| DE | 6607175 | 1/1971 |
| DE | 2630488 A1 | 1/1978 |
| DE | 3141512 A1 | 5/1983 |
| DE | 3725887 A1 | 2/1989 |
| DE | 19638321 A1 | 4/1998 |
| DE | 19753918 C1 | 7/1999 |
| DE | 10047493 A1 | 4/2002 |

* cited by examiner

Primary Examiner—Enoch Peavey
(74) Attorney, Agent, or Firm—Howard & Howard

(57) ABSTRACT

Slit ring seal, especially running gear seal, consisting of an angle-shaped slip and/or opposing ring with a circumferential surface designed to accent a ring-shaped, approximately cross-sectional plate-spring shaped sealing body, where the sealing body, as needed, includes a secondary seal directed toward the area of the sealing shaft of the slip, and/or opposing ring, and supports itself with segment areas of its outer circumferential surface on corresponding surface areas of an installation bore, where a ring-shaped securing element is provided radially between the outer circumferential surface of the slip and/or opposing ring and the installation bore, contacting the sealing body in the installed condition.

8 Claims, 1 Drawing Sheet

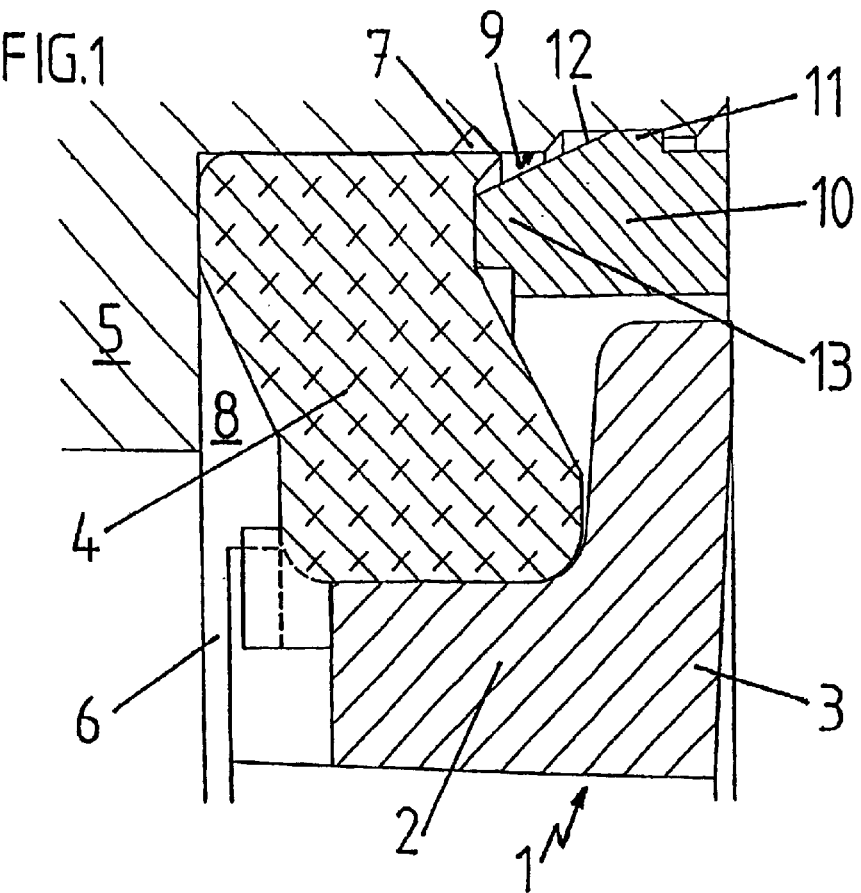
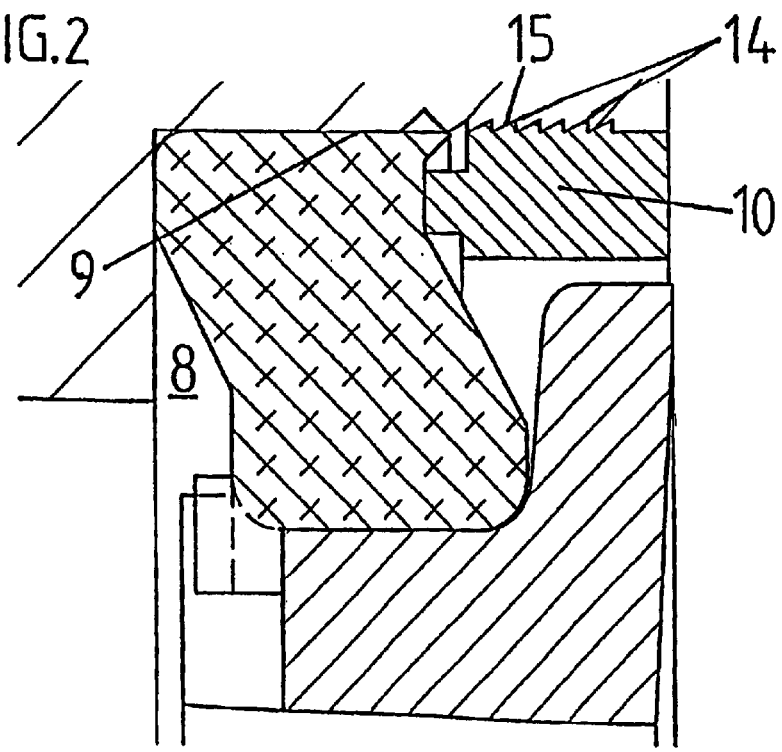

SLIP RING SEAL

This invention claims priority to German Patent Application 102 38 166.6 filed Aug. 21, 2002.

BACKGROUND OF THE INVENTION

1. Technical Field

The invention is a slip ring seal, especially running gear seal, consisting of an angle-shaped slip and/or opposing ring with a surrounding surface designed to mount a ring-shaped sealing body with a cross-section approximating that of a plate spring, where the sealing body includes a secondary seal oriented toward the area of the sealing shaft of the slip and/or opposing ring, and is supported by segments of its outer circumference surface at corresponding surface segments of a bearing bore.

2. Related Art

A similar slip ring seal is found in U.S. Pat. No. 4,256,315. To prevent the entry of dirt in the sliding surface area, the plate spring shaped sealing body has secondary seal in the shape of a sealing lip that is of one piece with the sealing body.

In DE-C 197 53 918, a slip ring seal is described in which the secondary seal is made of a stable, pressure-resistant material as a separate component and is attached to the sealing body, and is axially supported by the sealing shaft.

A slip and/or opposing ring of a slip ring seal is made known in DE-A 31 41 512, which is especially suited for use under relatively high pressures, with a conical circumferential surface designed to mount at least one elastic rolling body, where the rolling body in the installed condition extends between the conical circumferential surface and another, also conical shaped corresponding circumferential surface of a machine or housing part that accepts the slip and/or opposing ring. At least one additional secondary sealing location is located between the slip and/or opposing ring and the corresponding machine or housing part, on the side toward the medium. The same is advantageously made as an O-ring that is mounted in a groove running around the cylindrical area of the slip and/or opposing ring. The O-ring is, in this case, always on side toward the pressure.

Running gear seals in the shape of an angle are also often used in axles with so-called wet brakes, in which increased lubricating oil rinse/cooling pressure occurs and must be sealed against. Due to the design, the foreseeable internal pressure in this sealing configuration is much higher than in running gear seals such as are described in DE-A 31 41 512, for example. Here it can occur that the sealing body is pressed out of its cylindrical seat by the pressure building up on the rear part of the seal. The slip ring seal is then no longer functional. Considering the low installation space available, solutions such as those presented in DE-A 3141512 are not suitable for solving this particular problem.

SUMMARY OF THE INVENTION

The invention addresses the task of expanding on the mating part of the slip ring seal described in the first patent claim, especially a running gear seal, so that it also allows increased internal pressure, and is therefore safely applicable to the application indicated. This task is solved in that a ring-shaped securing element is located radially between the outer circumferential surface of the slip and/or opposing ring and the installation bore, contacting the seal in the installed position. Advantageous extensions of the invention are found in the sub-claims.

With this invention, it is not necessary to modify the actual and well-known seal cross section. The seal is inserted by hand into the cylindrical bore in the normal shape, and the possibly present secondary lip is deformed radially, and then, as described in the state of the technology, contacts the inside of the cylindrical bore. Subsequently the securing element, consisting of a sufficiently elastic ring, preferably made of fiber-reinforced plastic (polyamide) or other suitable materials, is pressed into the radial free space between the slip and/or opposing ring and the installation bore. If features or profiles are provided on the outer circumference of the securing element, then it is sensible to provide the outer circumferential surface of the installation bore with appropriately formed undercuts, in which the features/profiles can then latch upon axial insertion of the securing element in the installation bore.

By this means, the securing element is securely held in its position axially, thereby preventing it from being pressed out. If a secondary sealing lip is present, the area of the securing element oriented toward it can be made wedge-shaped, so that the secondary sealing lip is pressed outward. By this means, an additional sealing effect is achieved. With the invention, without great technical production difficulty, a solution is provided that makes it possible to use a running gear seal equipped with an angle-shaped slip and/or opposing ring, even in areas in which higher internal pressure is present. For cross sections of the securing element that are designed to be more sturdy, it can be made with radial slits on the inside or the outside, in an appropriate shape, in order to optimize the necessary elasticity during insertion.

Depending on the pressure level, the number of bearing features/profiles on the outer circumference of the securing element can be increased as needed. With regard to optimal seating, a sawtooth profile can be used here advantageously.

DRAWINGS

The invention is shown in the drawing using a sample application, and is described as follows. Shown are:

FIG. 1 and 2 Slip ring seal made as a running gear seal, for use under high internal pressure, including securing elements of various styles.

DETAILED DESCRIPTION

FIG. 1 shows a slip ring seal made as a running gear seal 1, including an angle-shaped slip ring 2 with a sealing shaft 3, which accepts a sealing body 4 that is generally plate-spring shaped in the area oriented toward the sealing shaft 3. The running gear seal 1, in this example, should be used on an axle 5 with so-called wet brakes, which are not shown further. With wet brakes, increased lubricating rinse/cooling pressure exists in the area 6 behind the sealing body 4, which is able to displace the sealing body 4 out of its position in the direction of the sealing shaft 3, whereby the running gear seal 1 becomes ineffective.

In this example, the secondary seal 7, made as a sealing lip, is present on the sealing body 4. The label 8 indicates the installation bore of the axle 5. The running gear seal 1, known in itself, is inserted by hand in the cylindrical installation bore 8, where the secondary seal 7, formed as a sealing lip, is deformed radially and then contacts the outer circumferential surface 9 of the installation bore 8. Now, in order to prevent the sealing body 4 from being moved in the direction of the sealing shaft by the increasing internal pressure, per the invention a securing element 10 is now used, which is provided with a radial feature 11 in the area of its external circumference. The actual and known seal cross section thereby does not need to be modified. The installation bore 8 must simply be provided with a small undercut 12. Upon insertion of the securing element 10, which is slit on the inside or outside as needed, which should, in this example, be made of a fiber-reinforced plastic such as polyamide, is securely held in its position axially and thereby prevented from being pressed out. A guiding and clamping wedge 13 attached or formed on the sealing body side also presses the secondary seal, whereby a further sealing effect is achieved.

FIG. 2 is, from a design standpoint, essentially the same as FIG. 1. The differences are simply related to the design of the outer circumferential surface of the securing element 10 and the outer circumferential surface 9 of the installation bore 8. The securing element 10 is, in this example, provided with a sawtooth profile 14, which engages correspondingly formed undercuts 15 in the outer circumferential surface 9 of the installation bore 8 following completion of assembly.

What is claimed is:

1. A Slip ring seal assembly comprising a slip ring positionable within an installation bore of a member to be sealed, said slip ring having a circumferential outer surface; ring-shaped sealing body encircling and engaging said circumferential outer surface of said slip ring, said sealing body including an outer circumferential surface adapted to engage a corresponding support surface of the bore of the member to be sealed, said sealing body including a secondary seal directed radially outwardly of said outer circumferential surface of said sealing body in position to sealingly engage the bore of the member to be sealed; a ring-shaped securing element encircling said slip ring in axially adjacent contacting relation to said sealing body and including a securing shoulder facing axially away form said sealing body in position to engage a corresponding retaining feature of the bore when installed in the bore to secure said sealing body against removal axially out of the bore past said securing element.

2. A Slip ring seal assembly as in claim 1 wherein the securing element is made of plastic.

3. A Slip ring seal assembly as in claim 2 wherein the plastic is fiber-reinforced plastic.

4. A Slip ring seal assembly as in claim 2 wherein the plastic is fiber-reinforced polyamide.

5. A Slip ring seal assembly as in claim 1 wherein said securing shoulder is provided on an outer circumference of said securing element.

6. A Slip ring seal assembly as in claim 5 wherein said securing shoulder comprises a sawtooth profile formed on said outer circumference of said securing element.

7. A Slip ring seal assembly as in claim 1 wherein a wedge-shaped area is formed on said securing element on the sealing body side in axially pressing engagement with said sealing body to enhance the radial sealing action of said secondary seal.

8. A Slip ring seal assembly as in claim 1 wherein said securing element includes radial slits from one of an inside and outside of said securing element.

* * * * *